United States Patent [19]

Kaneko et al.

[11] Patent Number: 5,123,376
[45] Date of Patent: Jun. 23, 1992

[54] APPARATUS FOR MANUFACTURING MAGNETIC RECORDING MEDIUM

[75] Inventors: Shiro Kaneko; Masao Takei; Tadashi Yasunaga, all of Kanagawa, Japan

[73] Assignee: Fuji Photo Film Co., Ltd., Kanagawa, Japan

[21] Appl. No.: 641,399

[22] Filed: Jan. 15, 1991

[30] Foreign Application Priority Data

Jan. 16, 1990 [JP] Japan .................................. 2-4475

[51] Int. Cl.$^5$ .............................................. C23C 16/00
[52] U.S. Cl. .................................... 118/718; 118/715; 118/725
[58] Field of Search ...................... 118/718, 715, 725

[56] References Cited

U.S. PATENT DOCUMENTS 3,296,014  1/1967  Williams ........................... 118/50
4,643,915  2/1987  Arai et al. ........................ 427/130

FOREIGN PATENT DOCUMENTS 59-063031  4/1984  Japan .

*Primary Examiner*—Richard Bueker
*Attorney, Agent, or Firm*—Sughrue, Mion, Zinn, Macpeak & Seas

[57] ABSTRACT

An apparatus for manufacturing a magnetic recording medium, including a device for oxidizing the surface of a thin magnetic film formed on a flexible carrier. A hermetic chamber is provided including a roll loading chamber for accommodating a supply roll of the carrier on which the thin magnetic film has been deposited in advance, a processing chamber, and a roll takeout chamber for accommodating a take-up roll of the carrier. A rotatable heating roll is disposed in the processing chamber. The carrier is guided from the supply roll accommodated in the roll loading chamber into the processing chamber and through a predetermined angle along the surface of the heating roll and then to the take-up roll accommodated in the takeout chamber. A baffle plate is provided near a peripheral surface of a portion of the heating roll on which the carrier is wound, and a plurality of nozzle units are provided in the plate for blowing gaseous oxygen or ozone toward the magnetic film.

12 Claims, 3 Drawing Sheets

APPARATUS FOR MANUFACTURING MAGNETIC RECORDING MEDIUM

BACKGROUND OF THE INVENTION

The present invention relates to an apparatus for manufacturing a magnetic recording medium, and more particularly relates to a device for manufacturing a magnetic recording medium through the oxidization of the surface of a thin magnetic film formed by ion plating, evaporative deposition or the like.

A magnetic recording medium formed of a thin film of a ferromagnetic metal directly deposited on a carrier by utilizing the methods of vacuum evaporative deposition, sputtering, ion plating or the like has recently been used to meet the demand for higher recording density in magnetic recording media. Although the magnetic recording medium of the thin ferromagnetic metal film type has a number of advantages in terms of magnetic properties, it has the disadvantages that the thin film constituting the magnetic recording layer of the medium is very likely to be oxidized and is likely to undergo exfoliation from the carrier or other damage due to contact with the recording/playback magnetic head during recording or playback. To eliminate these problems, proposals have been made to provide various protective layers on the surfaces of such thin ferromagnetic metal films.

A method of manufacturing a magnetic recording medium in which a magnetic recording layer is formed of a ferromagnetic metal such as iron, nickel and cobalt or an alloy of such metals on a plastic sheet carrier by evaporative deposition method or the like has been widely used. In accordance with one proposed apparatus, gaseous oxygen or ozone is blown against the magnetic recording layer, or the layer is exposed to an atmosphere of oxygen or ozone to oxidize the surface of the layer so as to maintain the electromagnetic converting property, durability and corrosion resistance of the medium for a long period of time. Such an apparatus is disclosed, for instance, in Japanese Unexamined Published Patent Applications Nos. 26319/83 and 63031/84, and Japanese Patent Application No. 21534/89.

In the processing methods disclosed in Japanese Unexamined Published Patent Application No. 63031/84 and Japanese Patent Application No. 21534/89, the magnetic recording layer can be oxidized immediately after being deposited on the carrier. However, the conditions for oxidization are restricted by the conditions which must be maintained for forming the layer itself. As a result, the efficiency of oxidization is very low, that is, the speed of the oxidization cannot be increased. This is a problem. Moreover, since the magnetic recording layer is exposed to ozone for the long period of 10 to 60 minutes in the processing method disclosed in Japanese Unexamined Published Patent Application No. 26319/85, the productivity of the method is so low as to not be acceptable for practical industrial use. This is also a problem.

SUMMARY OF THE INVENTION

The present invention was made in order to solve the above-discussed problems. Accordingly, it is an object of the invention to provide an apparatus for manufacturing a magnetic recording medium which is capable of achieving high productivity due to very efficient oxidization of the magnetic layer of the medium so as to ensure that the electromagnetic converting property, durability and corrosion resistance of the magnetic layer are maintained for a long period of time.

In accordance with the present invention, there is provided an apparatus for manufacturing a magnetic recording medium which incorporates a device which oxidizes the magnetic layer of the magnetic recording medium after the layer is deposited on a flexible carrier in manufacturing the medium, which device is characterized in that the carrier already provided with the layer is continuously unwound from a supply roll in a hermetic chamber, then wound through a prescribed angle on a rotatable heating roll, and then wound on a take-up roll, a baffle plate is provided near the peripheral surface of the portion of the heating roll on which the carrier is wound, and gaseous oxygen or ozone is blown against the layer from nozzles provided inside the baffle plate.

DESCRIPTION OF THE PREFERRED EMBODIMENTS

Preferred embodiments of the present invention are hereafter described with reference to the drawings attached hereto. However, it should be noted that the invention is not confined to these embodiments.

Figure 1:
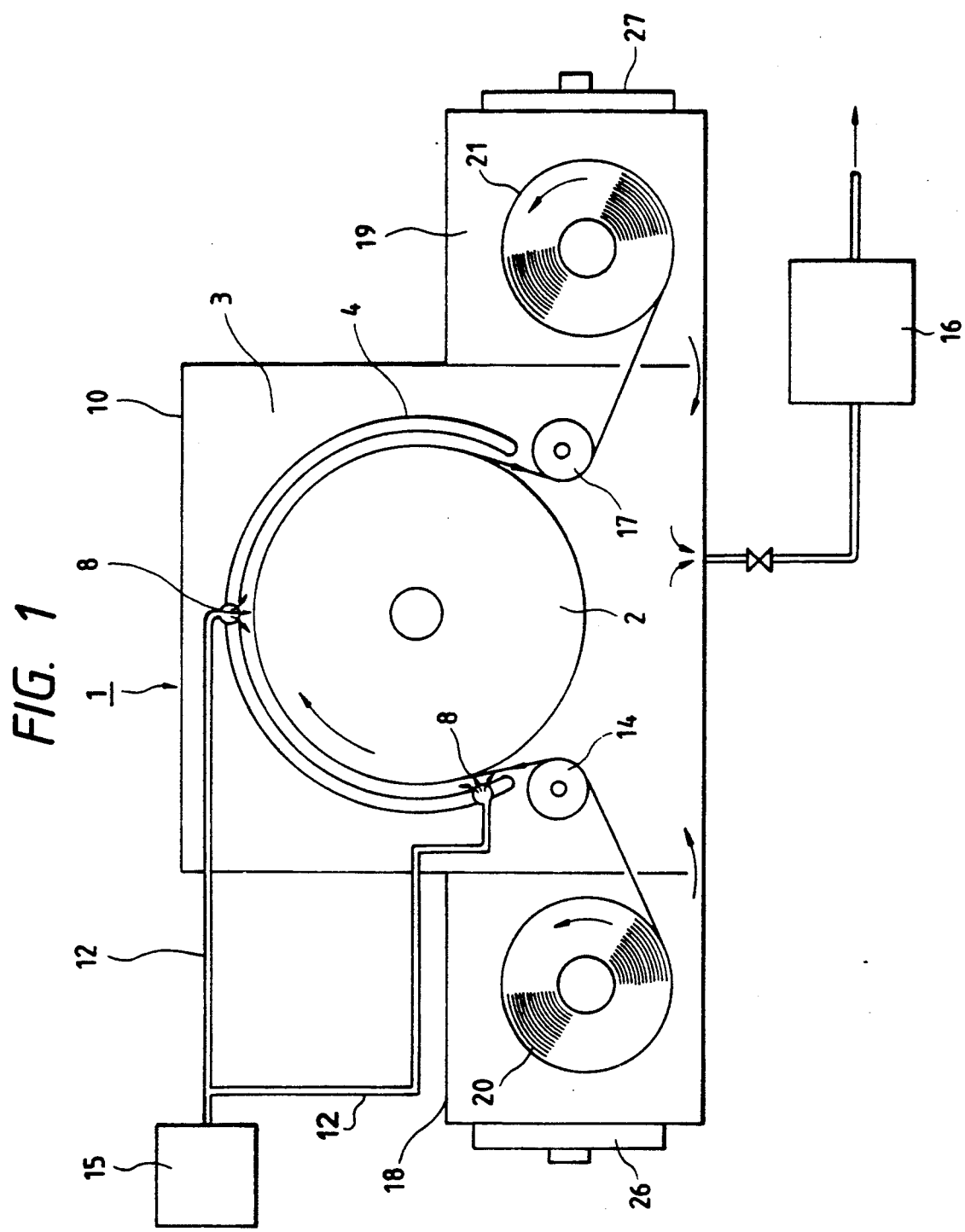
FIG. 1 is a schematic view of a device for oxidizing the magnetic layer of a magnetic recording medium for use in an apparatus for manufacturing a magnetic recording medium constructed in accordance with a preferred embodiment of the present invention.

FIG. 1 shows a device 1 for oxidizing the magnetic layer of a magnetic tape T in manufacturing the tape, and constitutes a first preferred embodiment of the invention. The device 1 basically includes a hermetic chamber 10 including a processing chamber 3 provided with a heating roll 2, and two tape roll accommodation chambers adjacent the processing chamber and located on mutually opposite sides thereof. One of the tape roll accommodation chambers is a roll loading chamber 18 in which a supply roll 20 is accommodated. The other of the tape roll accommodation chambers is a roll takeout chamber 19, from which a completed wound roller 21 is removed. The roll loading chamber 18 is provided with a hermetic door 26, which is opened when the supply roll 20 of the magnetic tape T is put into the chamber before the tape is subjected to oxidization. The roll takeout chamber 19 is provided with a hermetic door 27, which is opened when the wound roll 21 of the magnetic tape T is taken out from the chamber after the tape is subjected to the oxidization.

A preheating roll 14 for preheating the magnetic tape T and guiding the movement thereof is provided in the passage for the tape upstream of the heating roll 2 with regard to the direction of movement of the tape. A cooling roll 17 for cooling the magnetic tape T to an appropriate temperature of about 10° to 50° C. before the tape is wound on the wound roll 21 is provided in the passage of the tape downstream of the heating roll 2 with regard to the direction of movement of the tape.

The device further includes a gas discharge system (ozone generator) 15 for maintaining the pressure or concentration of gas in the hermetic chamber 10 at a desired level. The system is also provided with an ozone decomposer 16 for preventing problems arising due to the leakage of ozone gas.

Air can be supplied into the roll takeout chamber 19 to make the pressure of the air therein higher than that in the processing chamber 3 to prevent the ozone gas from entering the roll takeout chamber 19 and over-oxidizing the magnetic layer of the tape T wound on the wound roll 21 therein, thus ensuring that the quality of tape is uniformly good.

To supply ozone gas into the processing chamber 3, the ozone is produced by the ozone generator 15, and is then injected into the chamber 3 through pipes 12 and two ejection nozzle units 8.

A baffle plate 4 whose width is not less than that of the magnetic tape T is provided in the processing chamber 3, extending along the tape portion wound on the heating roll 2. The distance between the baffle plate 4 and the peripheral surface of the heating roll 2 is not confined to a particular value, but may be set at 2 to 30 mm, for example. The ozone ejection nozzle units 8 are provided inside the baffle plate 4, and located at an appropriate distance from each other. One of the nozzle units 8 is located at the upstream end portion of the baffle plate 4 with regard to the direction of movement of the magnetic tape T, and the other of the units is located at the middle portion of the plate so that the ozone gas supplied from the nozzle units accompanies the tape sufficiently.

Figure 2:
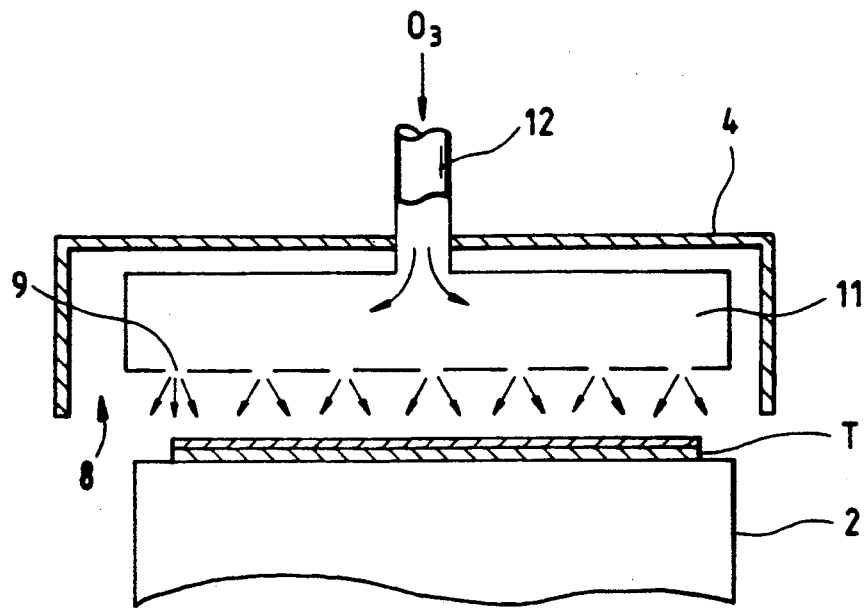
FIG. 2 is a partially sectional view of the ejection nozzle unit and baffle plate of the device.

Each of the nozzle units 8 includes a cylindrical body 11 extending rightward and leftward from the tip of the pipe 12 along the width of the magnetic tape T, and a plurality of nozzles 9 provided at equal intervals in the body and directed toward the magnetic layer of the tape, as shown in FIG. 2. If the diameter of the heating roll 2, the length of the baffle plate 4, the width of the magnetic tape T, the speed of the movement of the tape, the concentration of the ozone gas on the tape, the flow rate of the ozone gas and the temperature of the heating of the magnetic layer of the tape are 1,000 mm, 2,000 mm, 300 mm, 0.5 to 15 m/min, 20 to 150 g/m$^3$, 1 to 15 l/min and the room temperature to 140° C., respectively, for oxidizing the magnetic layer with the ozone gas, the distance between the tape and the nozzles 9, the distance between the nozzles and the diameter of each of the nozzles may be set at 5 mm or less, 5 mm or less, and 1 mm or less, respectively, so that the magnetic layer is uniformly oxidized with the ozone gas.

Figure 3:
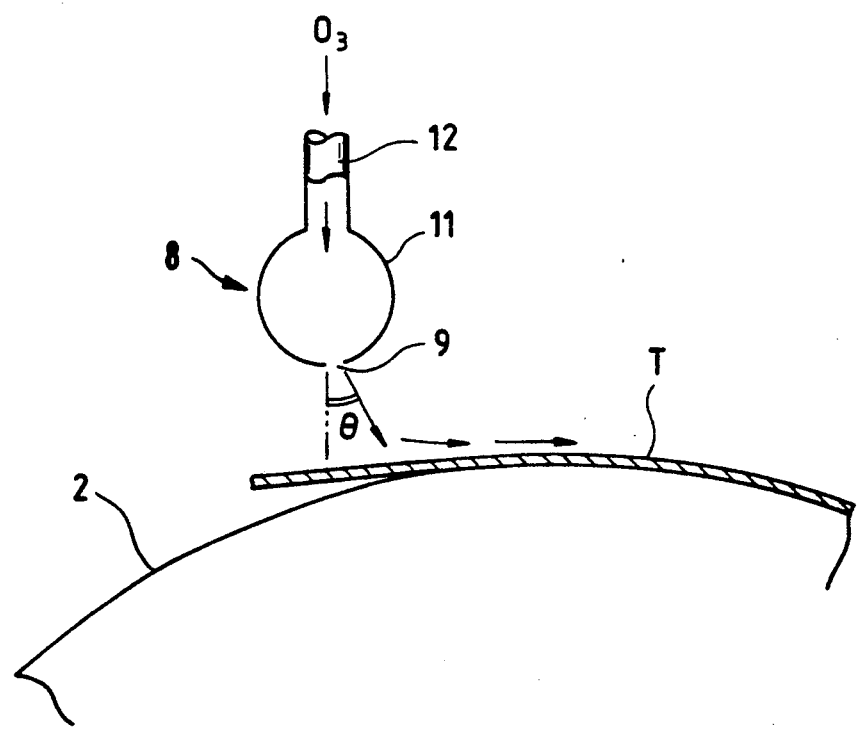
FIG. 3 is a partially sectional view showing the direction of ejection of gas flow of ozone.

It is preferable that the direction of ejection of the ozone gas from each of the nozzles 9 toward the surface of the magnetic layer of the tape T not be perpendicular to that of the movement of the tape, but that the angle $\theta$ between the direction of the ejection of the ozone gas and the perpendicular to the surface of the magnetic layer is more than 0°, as shown in FIG. 3. With this setting, the ozone gas is very likely to accompany the tape T, and the impact of the ozone gas on the magnetic layer of the tape is low, even if the speed of ejection of the ozone gas from the nozzle 9 is high. Since one of the nozzle units 8 is provided at the middle portion of the baffle plate 4 to eject the ozone gas toward the magnetic tape T at the middle portion and the other of the nozzle units is provided at the upstream end portion of the baffle plate with regard to the direction of movement of the tape to eject the ozone gas toward the tape on the upstream end portion, the concentration of ozone gas on the tape is prevented from dropping too much while accompanying the moving tape on the heating roll 2. Since the plurality of nozzles 9 are juxtaposed along the entire width of the magnetic tape T, the ozone gas is not only uniformly blown against the entire surface of the magnetic layer of the tape, but also air accompanied with the moving tape is prevented from being involved and accompanying the moving tape on the heating roll 2. Since the baffle plate 4 is provided near the peripheral surface of the portion of the heating roll 2 which the carrier of the tape T contacts, the ozone gas supplied from the nozzles 9 is somewhat enclosed between the baffle plate and the peripheral surface of the heating roll so that the concentration of ozone gas on the tape is maintained sufficiently high, even if the supplied quantity of the ozone gas is low. For this reason, the concentration of ozone gas in the whole of the processing chamber 3 need not be high. The surface of the magnetic layer of the tape T is thus oxidized with the ozone gas very efficiently. Moreover, significant losses of the heat of the heating roll 2 are prevented.

Since such a magnetic tape tends to warp after manufacture, a warp removal process is performed in a conventional device to remove the warp from the tape. However, in the device of this embodiment of the present invention, the temperature of the heating roll 2 can be appropriately set so as to remove such a warp from the magnetic tape T while simultaneously oxidizing the surface of the magnetic layer thereof.

The number of the ejection nozzle units 8 is not confined to two, but may be more than two. Also, oxygen gas may be used instead of ozone gas.

Although the baffle plate 4 and the ejection nozzle units 8 are provided separately from each other in the embodiment described above, the present invention is not confined to such an arrangement, and may be otherwise embodied as will now be described with reference to FIG. 4.

Figure 4:
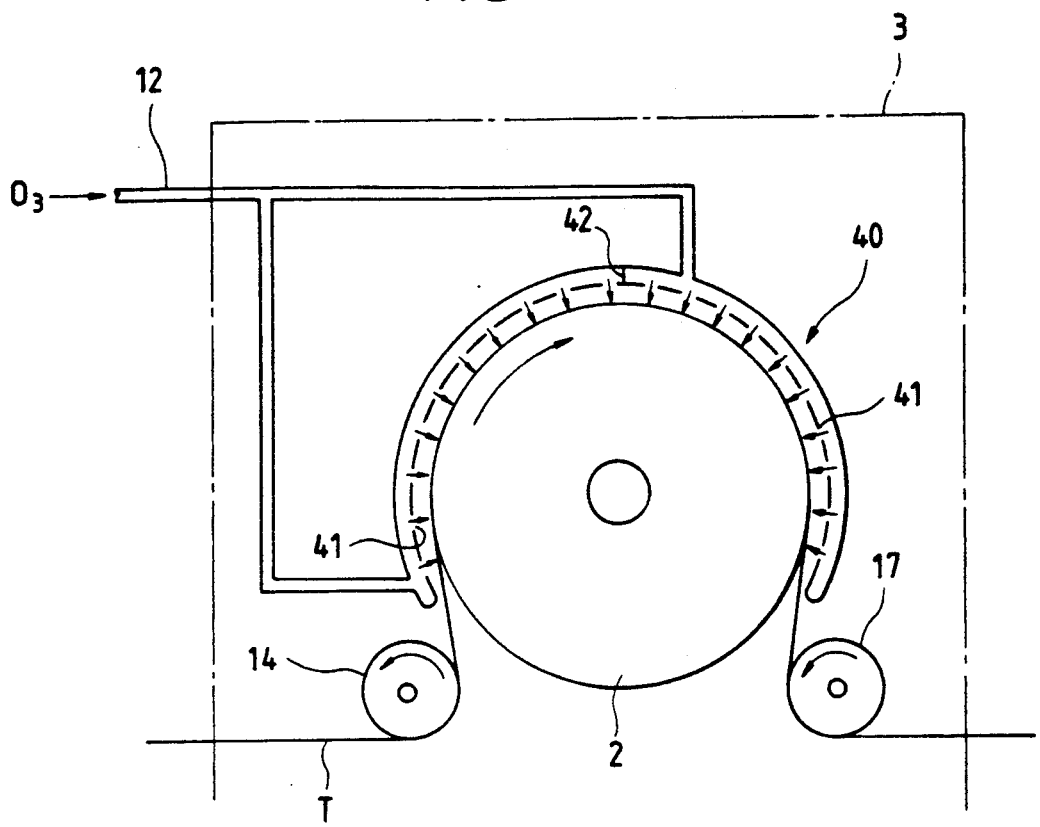
FIG. 4 is a schematic view of another embodiment of a device of the present invention for oxidizing the surface of a magnetic layer of a magnetic recording medium.

In the embodiment of FIG. 4, a baffle plate 40 is made of a hollow plate having a large number of nozzles 41 in the whole side of the plate which faces a heating roll 2, as shown in FIG. 4. Ozone gas is ejected from the nozzles 41 toward a magnetic tape T. The interior of the baffle plate 40 is divided into two sections by a partition plate 42. Pipes 12 are connected to the sections. The size of each of the nozzles 41 may be altered depending on the position of the nozzle in consideration of the position of the connected portion of the pipe 12 for the nozzle, the distribution of the pressure of the ozone gas, and so forth.

The cross section of each of the nozzles 9 and 41 is not confined to being circularly shaped, but may be shaped as a slot.

Figure 5:
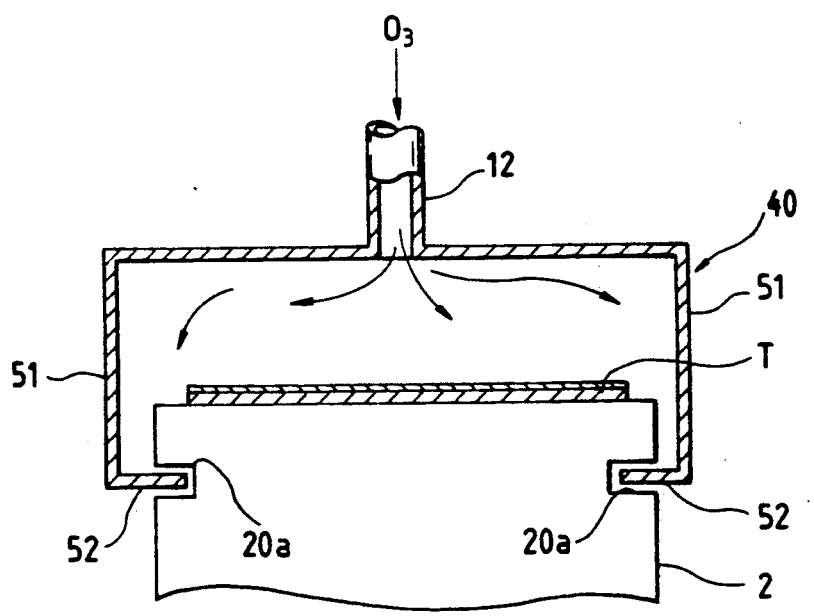
FIG. 5 is a sectional view of a major part of yet another embodiment of a device of the invention for oxidizing the surface of a magnetic layer of a magnetic recording medium.

The present invention may be yet otherwise embodied so that a baffle plate 40 is bent at both side edge portions 51 thereof and has both its side edges 52 located in the grooves 20a of the sides of a heating roll 2, as shown in FIG. 5, to very much heighten the degree of the closure of an oxidization space defined by the baffle plate and the heating roll.

The device provided in accordance with the present invention for oxidizing the magnetic layer of a magnetic recording medium after the layer is deposited on a flexible carrier in manufacturing the medium is characterized in that the carrier already provided with the magnetic layer is continuously unwound from an supply roll in a hermetic chamber, then wound through a prescribed angle on a rotatable heating roll, and then wound on a wound roll, a baffle plate is provided near the peripheral surface of the portion of the heating roll on which the carrier is wound, and gaseous oxygen or ozone is blown toward the magnetic layer from ejection nozzles provided inside the baffle plate.

Since the baffle plate is provided near the peripheral surface of the portion of the heating roll with which the carrier of the medium is brought into contact, the gaseous oxygen or ozone is uniformly blown against the entire surface of the magnetic layer. Since the gaseous oxygen or ozone supplied from the ejection nozzles is somewhat enclosed between the baffle plate and the peripheral surface of the heating roll so as to maintain the concentration of the gaseous oxygen or ozone on the magnetic layer of the medium sufficiently high even if the supplied quantity of the gaseous oxygen or ozone is low, the concentration thereof in the whole of the hermetic chamber does not need to be high. For this reason, the magnetic layer can be oxidized with the gaseous oxygen or ozone very efficiently. Also, the heat of the heating roll is prevented from being lost, and the temperature of the heating roll can be set so as to remove the warp of the carrier while simultaneously oxidizing the magnetic layer with the gaseous oxygen or ozone.

What is claimed is:

1. In an apparatus for manufacturing a magnetic recording medium, wherein the apparatus comprises a device for oxidizing the surface of a thin magnetic film formed on a flexible carrier comprising: a hermetic chamber including a roll loading chamber for accommodating a supply roll of said carrier on which said thin magnetic film has been deposited in advance, a processing chamber, and a roll takeout chamber for accommodating a take-up roll of said carrier; a rotatable heating roll disposed in said processing chamber; means for guiding said carrier from said supply roll accommodated in said roll loading chamber into said processing chamber and through a predetermined angle along the surface of said heating roll and then to said take-up roll accommodated in said takeout chamber; a baffle plate provided near a peripheral surface of a portion of said heating roll on which said carrier is wound; and a plurality of nozzle units provided in said plate for blowing gaseous oxygen or ozone toward said magnetic film.

2. The apparatus of claim 1, wherein said guiding means comprises: a preheating roll for preheating said magnetic recording medium and guiding the movement of said magnetic recording medium, said preheating roll being positioned upstream of said heating roll with regard to the direction of movement of said magnetic recording medium and a cooling roll for cooling said magnetic recording medium and guiding the movement of said magnetic recording medium before said magnetic recording medium is wound on said take-up roll, said take-up roll being positioned downstream of said heating roll with regard to the direction of movement of said magnetic recording medium.

3. The apparatus of claim 2, wherein said cooling roll cools said magnetic recording medium to a temperature in a range of about 10° to 50° C.

4. The apparatus of claim 1, further comprising means for supplying air into said takeout chamber to make the pressure of the air therein higher than that in said processing chamber to prevent said gaseous oxygen or ozone from entering said roll takeout chamber and over-oxidizing said magnetic layer therein.

5. The apparatus of claim 1, wherein the width of said baffle plate is not less than the width of said carrier.

6. The apparatus of claim 1, wherein the distance between said baffle plate and said peripheral surface of the heating roll is in a range of 2 to 30 mm.

7. The apparatus of claim 1, wherein one of said nozzle units is located at the upstream end portion of said baffle plate with regard to the direction of movement of said carrier, and another of said nozzle units is located at a middle portion of said baffle plate.

8. The apparatus of claim 1, wherein each of said nozzle units comprises a cylindrical body extending rightward and leftward from a tip of a pipe said cylindrical body supplying said gaseous oxygen or ozone along the width of said carrier, and a plurality of nozzles provided at equal intervals in said cylindrical body and directed toward said magnetic film on said carrier.

9. The apparatus of claim 8, wherein the direction of ejection of gaseous oxygen or ozone from each of said nozzles toward the surface of said magnetic film forms an angle with a line that is perpendicular to the direction of movement of said carrier, such that said angle is greater than 0°.

10. In an apparatus for manufacturing a magnetic recording medium, wherein the apparatus comprises a device for oxidizing the surface of a thin magnetic film formed on a flexible carrier comprising: a hermetic chamber including a roll loading chamber for accommodating a supply roll of said carrier on which said thin magnetic film has been deposited in advance, a processing chamber, and a roll takeout chamber for accommodating a take-up roll of said carrier; a rotatable heating roll disposed in said processing chamber; means for guiding said carrier from said supply roll accommodated in said roll loading chamber into said processing chamber and through a predetermined angle along the surface of said heating roll and then to said take-up roll accommodated in said takeout chamber; a baffle plate provided near a peripheral surface of a portion of said heating roll on which said carrier is wound, said baffle plate comprising a hollow plate having a large number of nozzles in a side of said plate facing said heating roll; and means for supplying gaseous oxygen or ozone to the interior of said hollow plate so as to blow gaseous oxygen or ozone toward said carrier.

11. The apparatus of claim 10, further comprising a partition plate for dividing the interior of said baffle plate into two sections.

12. The apparatus of claim 10, wherein said baffle plate is bent at both side edge portions thereof and has both side edges located in grooves in the sides of said heating roll.

* * * * *